(12) United States Patent
Carter

(10) Patent No.: US 12,313,090 B2
(45) Date of Patent: May 27, 2025

(54) HYDRO-PNEUMATIC PRESSURE VESSEL AND DIAPHRAGM ASSEMBLY METHOD

(71) Applicant: FLEXCON INDUSTRIES, INC., Randolph, MA (US)

(72) Inventor: Thomas G. Carter, New Bern, NC (US)

(73) Assignee: FLEXCON INDUSTRIES, INC., Randolph, MA (US)

( * ) Notice: Subject to any disclaimer, the term of this patent is extended or adjusted under 35 U.S.C. 154(b) by 607 days.

(21) Appl. No.: 17/284,370

(22) PCT Filed: Oct. 11, 2019

(86) PCT No.: PCT/US2019/055937
§ 371 (c)(1),
(2) Date: Apr. 9, 2021

(87) PCT Pub. No.: WO2020/077264
PCT Pub. Date: Apr. 16, 2020

(65) Prior Publication Data
US 2021/0341000 A1    Nov. 4, 2021

Related U.S. Application Data

(60) Provisional application No. 62/744,403, filed on Oct. 11, 2018.

(51) Int. Cl.
*F15B 1/04* (2006.01)
*F15B 1/26* (2006.01)

(52) U.S. Cl.
CPC ............ *F15B 1/26* (2013.01); *F15B 2201/60* (2013.01)

(58) Field of Classification Search
CPC ........ F24D 3/1016; F24D 3/1008; F15B 1/02; F15B 1/04; F15B 2201/60; F16L 55/04; F16L 55/053; B65D 90/04
(Continued)

(56) References Cited

U.S. PATENT DOCUMENTS 3,137,317 A * 6/1964 Peters ...................... F16J 13/00
138/30
3,623,512 A * 11/1971 Ellwanger ............. F16L 55/052
138/30

(Continued)

*Primary Examiner* — Stephen J Castellano
(74) *Attorney, Agent, or Firm* — Loeb & Loeb LLP

(57) ABSTRACT

An expansion tank for at least temporarily storing a pumped liquid under pressure, the including a thin wailed outer shell and a diaphragm located internally of the tank, and sealingly secured to the inner surface of the shell of the tank to divide the internal volume of the tank into a fluid-tight section for holding a gas under pressure and a fluid-tight section for holding a liquid under pressure. The diaphragm has an enlarged lip around the outer circumference of the diaphragm and being is connected to the interior portion of one of the substantially cylindrical sections via the enlarged lip being fitted tightly into a coupling ring, which in turn presses the enlarged lip of the diaphragm sealingly, circumferentially against the inner circumferential surface of the tank wall when the outer circumferential surface of the coupling ring is sealingly connect to the inner wall surface of one of the tank segments, sealing the enlarged lip against the inner surface of the tank. The tank segments are not finally assembled until after the diaphragm is sealed against the tank wall, so that the diaphragm divides the interior volume of the tank into two mutually fluid tight volumes that can be rendered fluid tight with respect to the space outside of the tank walls.

7 Claims, 12 Drawing Sheets

(58) Field of Classification Search
USPC .......................................................... 138/30
See application file for complete search history.

(56) References Cited

U.S. PATENT DOCUMENTS

| | | | | |
|---|---|---|---|---|
| 3,948,287 A * | 4/1976 | Sugimura | ................. | F15B 1/14 |
| | | | | 138/30 |
| 3,963,052 A * | 6/1976 | Mercier | ................ | F16L 55/052 |
| | | | | 220/721 |
| 4,084,621 A * | 4/1978 | Sugimura | ................. | F15B 1/14 |
| | | | | 138/30 |
| 4,595,037 A * | 6/1986 | LeBreton | ................. | F15B 1/14 |
| | | | | 220/62.19 |
| 4,777,983 A * | 10/1988 | Steveley | ................... | F15B 1/10 |
| | | | | 138/30 |
| 4,784,181 A * | 11/1988 | Hilverdink | ............ | B29C 66/542 |
| | | | | 220/721 |
| 4,800,642 A * | 1/1989 | Stil | ......................... | F15B 1/14 |
| | | | | 228/184 |
| 5,386,925 A * | 2/1995 | Lane | .................... | F24D 3/1008 |
| | | | | 220/721 |
| 5,427,152 A * | 6/1995 | Weber | ...................... | F15B 1/14 |
| | | | | 138/30 |
| 6,016,841 A * | 1/2000 | Larsen | ................. | F16L 55/053 |
| | | | | 138/30 |
| 6,129,236 A * | 10/2000 | Osokin | .................... | F15B 1/14 |
| | | | | 222/386.5 |
| 2004/0173624 A1* | 9/2004 | Carter | .................. | F24D 3/1008 |
| | | | | 220/720 |

* cited by examiner

HYDRO-PNEUMATIC PRESSURE VESSEL AND DIAPHRAGM ASSEMBLY METHOD

TECHNICAL FIELD

The presently disclosed subject matter relates generally to a fiberglass reinforced plastic pressure (FRP) tank made with a plastic tank liner, a rubber flexible diaphragm and reinforced with a composite fiberglass/resin matrix.

BACKGROUND

Fiberglass reinforced plastic pressure (FRP) tanks are manufactured by several methods but all require the general construction of a sealed plastic tank liner, openings at either one or both ends of the tank liner and structural reinforcement. The structural reinforcement is achieved by applying epoxy impregnated fiberglass fibers onto the outer surface of the FRP tank in a controlled manner. This process is also known as filament winding.

The tank liner can be produced by one of several known methods but all require that prior to the application of the fiberglass reinforcement the flexible diaphragm needs to be installed into the plastic liner. The plastic liner can be manufactured by blow molding, injection molding, thermoforming, rotational molding and a combination of injection molded domes welded to an extruded sidewall.

The tank liner needed for use in the intended applications as mentioned may have numerous openings. At a minimum the tank will have one axial opening for the attachment of a drain or other connections for getting fluid in and out of the tank on one side of the flexible diaphragm. The other end will generally have a sealable valve in which pressurized air can be induced into the other side of the tank.

In order for the FRP tank to efficiently act as a delivery system of a fluid there needs to be a flexible diaphragm separating the fluid from pressurized air. This means that a method for forming two (2) chambers inside the tank is required. Once two (2) chambers are defined and there is an air tight seal between them the FRP tank can now act as a delivery device of pressurized fluids.

The methods for providing and defining the two (2) chambers are numerous but few in actual practice. There are several limitations and inherent properties of FRP tanks that present challenges to manufacturing on a repetitive basis a suitable and cost effective FRP tank. This is because of the rigid demands and structural integrity required for the FRP tank to function for an extended period of time. This invention disclosure intends to show an improved method for achieving this.

There are known examples where the flexible diaphragm is installed in the plastic liner. The U.S. Pat. Nos. 5,484,079 and 4,595,037 are two such examples for installing a flexible diaphragm in plastic liners. These patents show a method where a profile like a "O" ring is attached or integrated into the main body of the flexible diaphragm. The area of the "O" ring profile is generally equal to the circumference of the FRP tank. In U.S. Pat. No. 5,484,079 a seal seat is formed by the joining together of two (2) dome shaped halves of the plastic liner that have a seal seat as part of the domes. The "O" ring profile is trapped in the seal seat providing a hermetic seal between the two (2) chambers now formed in the FRP tank. In this example the seal area is formed in the same process as the dome shaped profiles. Because of limitations in the molding process for these domes the FRP tank size must grow in overall diameter if a larger interior volume is desired. This increases the cost for manufacturing larger FRP tanks as well as is less desirable for installation in smaller spaces. Therefore, the tank of U.S. Pat. No. 5,484,079 is limited to smaller 20 volume FRP tanks.

The U.S. Pat. No. 4,595,037 shows another method of using an "O" ring seal profile to form a hermetic seal between the flexible diaphragm and the tank liner. In this example a 3rd component is used to form the seal seat. There also is a second seal seat to provide sealing between the 3rd component and the upper half of the tank liner. In this example the seal between the lower half of the plastic liner and the 3rd component is provided by the "O" ring profile integrated into the flexible diaphragm. Therefore, the tank has two (2) seals in the tank. The disadvantage of this type of FRP tank construction is that the $3^{rd}$ component is an additional cost in the manufacturing and also must be placed in the middle of the two tank halves. This requires a larger flexible diaphragm then is required to achieve the ratio of the (2) chambers formed when the tank is sealed. The diaphragm is generally a very expensive part of a Hydro-pneumatic pressure vessel therefore the cost to manufacturer is higher than other methods.

SUMMARY OF THE INVENTION

There is provided an expansion tank for at least temporarily storing a pumped liquid under pressure. The expansion tank comprises a thin walled outer shell and a diaphragm located internally of the tank and circumferentially, sealingly secured to the inner surface of the shell of the tank to divide the internal volume of the tank into a fluid-tight section for holding a gas under pressure and a fluid-tight section for holding a liquid under pressure. The outer shell of the expansion tank is formed from separate segments including at least two partially cylindrical, dome-shaped sections, that are preferably joined together by a central cylindrical section to form the completed tank. The internal diaphragm has an enlarged lip at the outer circumference of the diaphragm and is sealingly connected to the interior portion of one of the substantially cylindrical sections by a coupling ring holding the enlarged lip at the outer circumference of the diaphragm against the inner surface of a cylindrical portion of the outer shell.

The coupling ring has inner and outer circumferential surfaces, the outer circumferential surface including a depression extending completely around the circumference, wherein the outer edges of the depression are separated by a distance not greater than the vertical dimension of the enlarged lip and the depression being sufficiently large to encompass the enlarged lip of the diaphragm. The coupling ring preferably further including on its inner circumferential surface at least one stress relieving member extending axially outwardly, most preferably in both axial directions away from the outer edges of the depression and preferably also angled radially outwardly towards the tank wall. The coupling ring is fabricated independent of the tank segments and the enlarged lip of the diaphragm is pressed into the depression in the outer circumferential surface of the coupling ring, which is then sealingly, circumferentially sealed to the inner circumferential surface of the tank wall such that the enlarged lip of the diaphragm is sealed between the inner circumferential surface of the tank wall and the outer circumferential surface of the coupling ring.

When assembling the completed tank, the open-ended sections of the tank shell are first formed, and a pre-formed enlarged lip of the diaphragm is placed within the depression in the outer circumferential surface of the coupling ring; the coupling ring holding the enlarged lip of the diaphragm is then sealingly connected to the inner cylindrical wall surface of one of the tank segments. The tank segments are then finally assembled such that the diaphragm is sealed within the tank walls and the diaphragm divides the interior volume of the tank into two mutually fluid tight volumes that can also be rendered fluid tight with respect to the space outside of the tank walls.

BRIEF DESCRIPTION OF THE DRAWINGS

Figure 1:
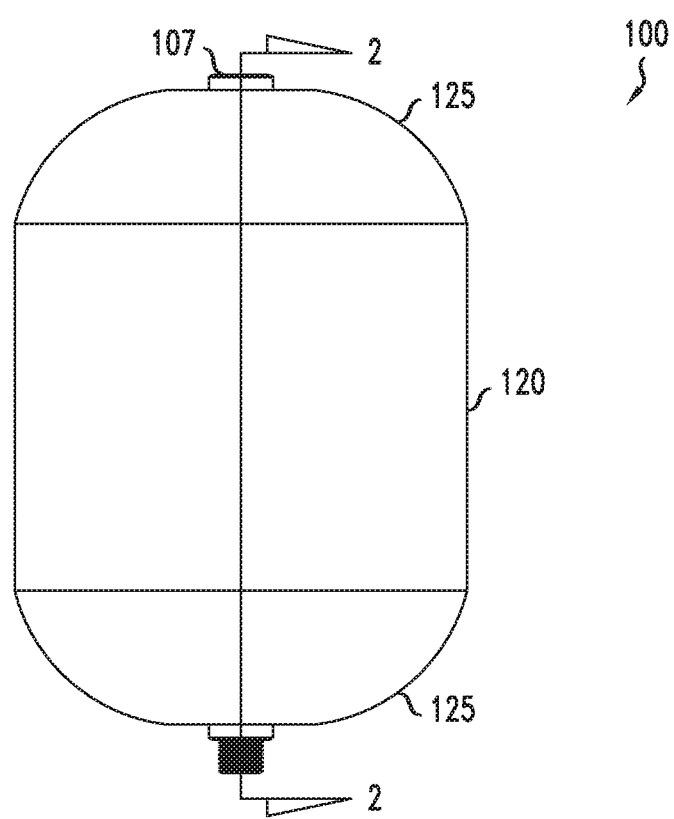
Figure 2:
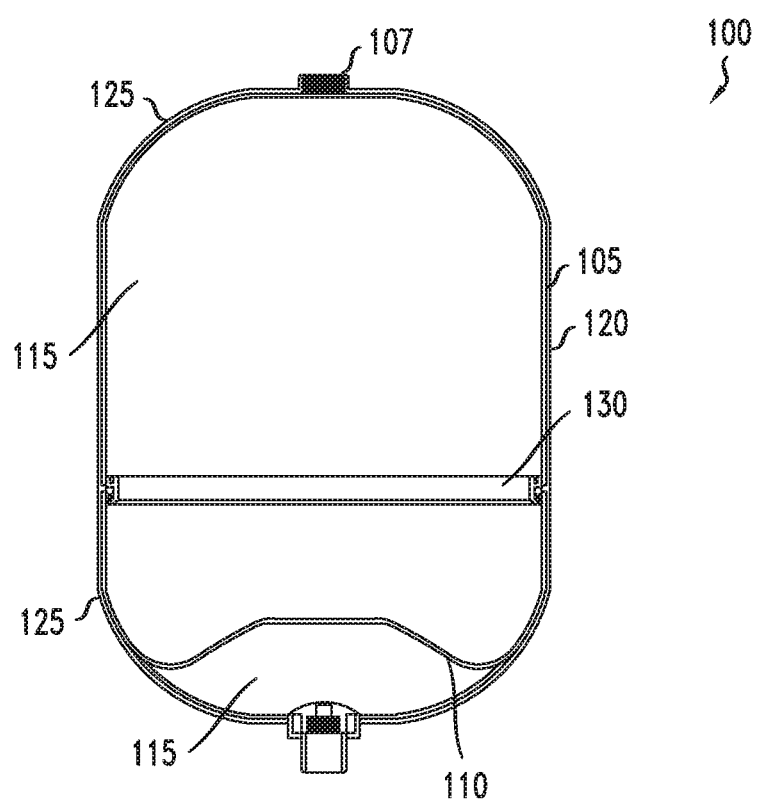
Figure 3:
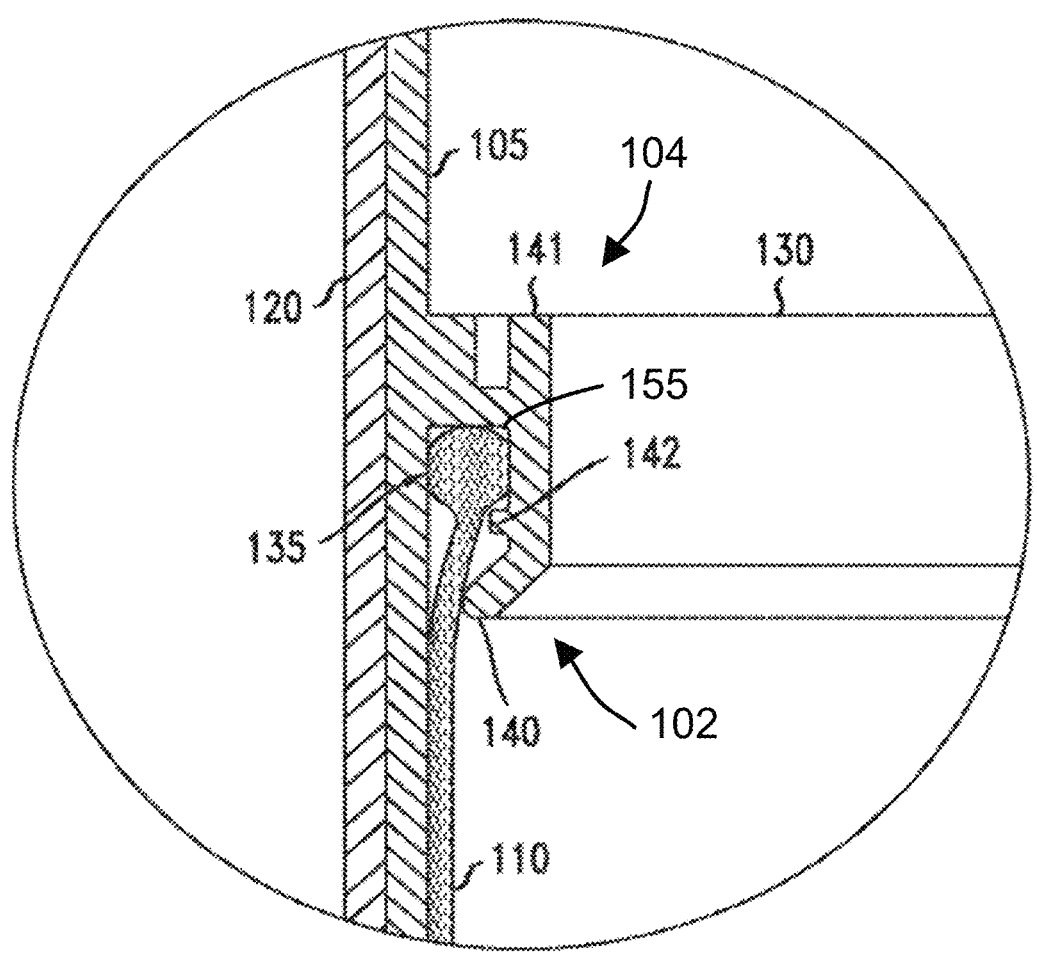
Figure 4:
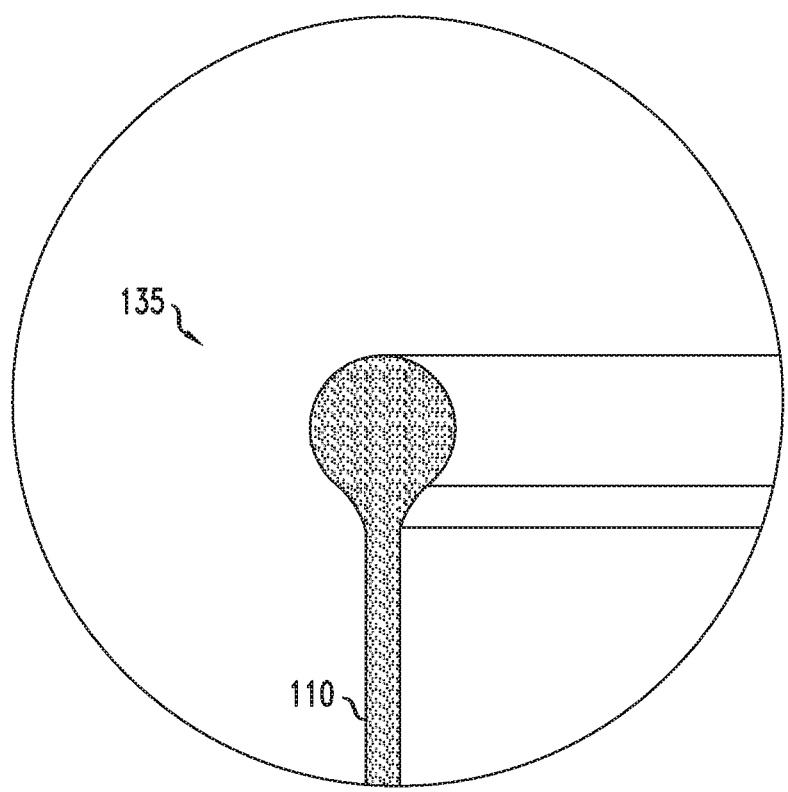
Figure 5:
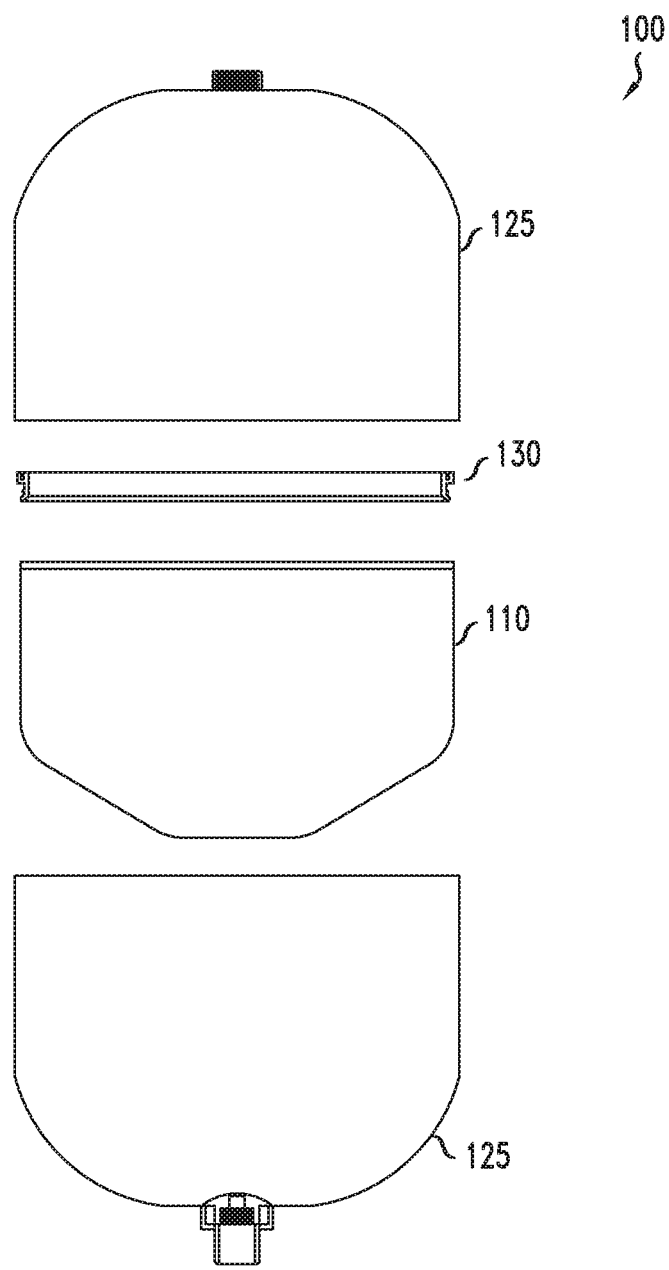
Figure 6:
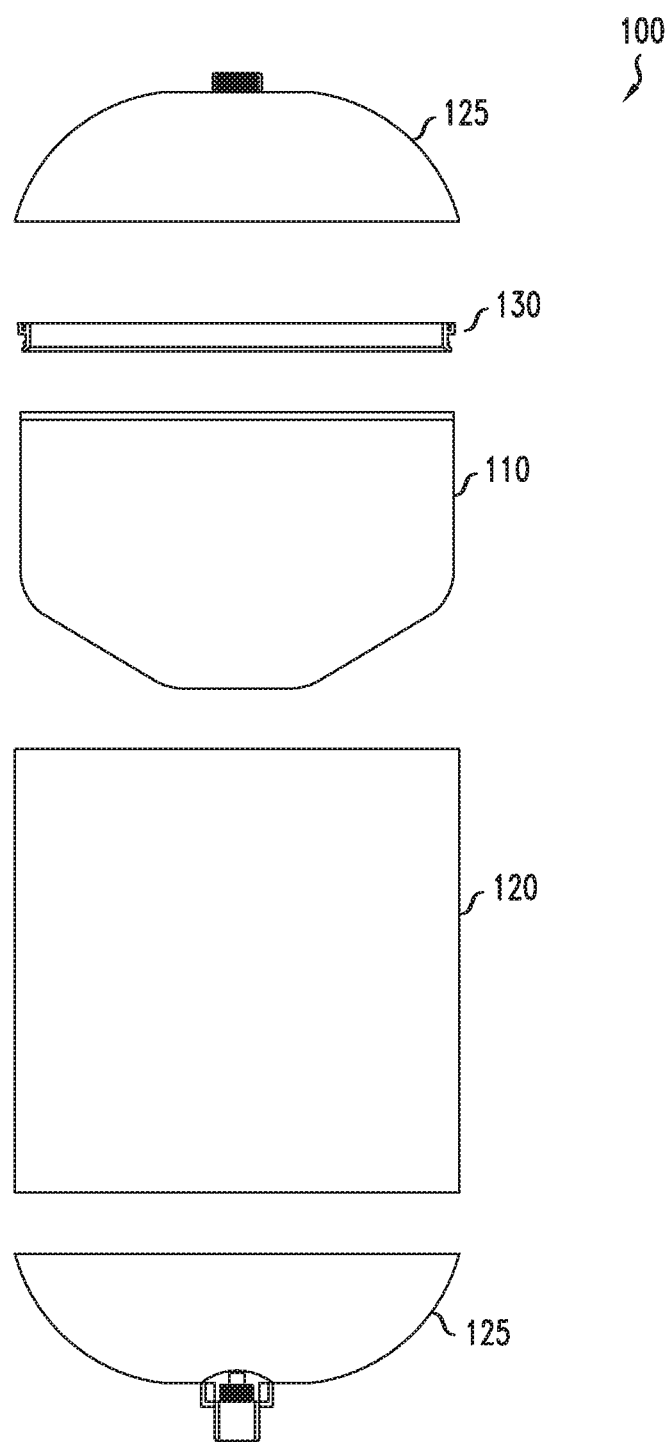
Figure 7:
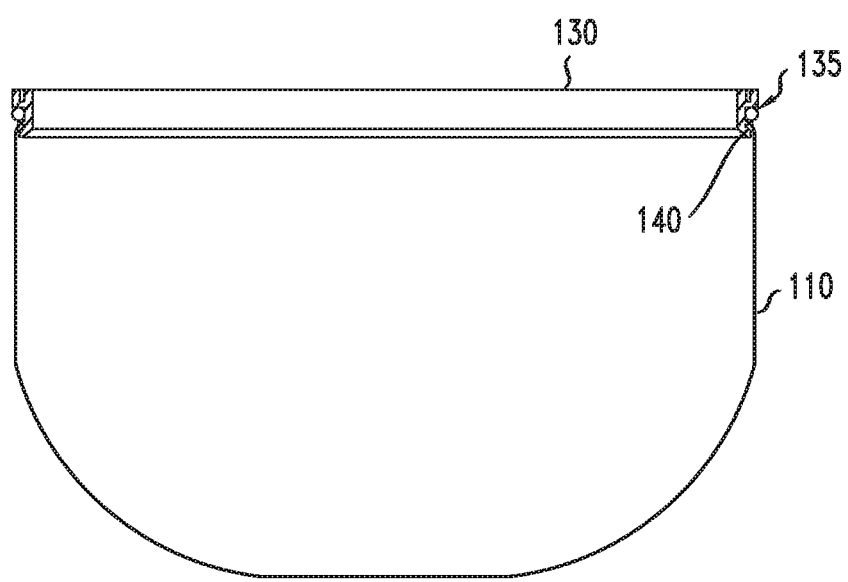
Figure 8:
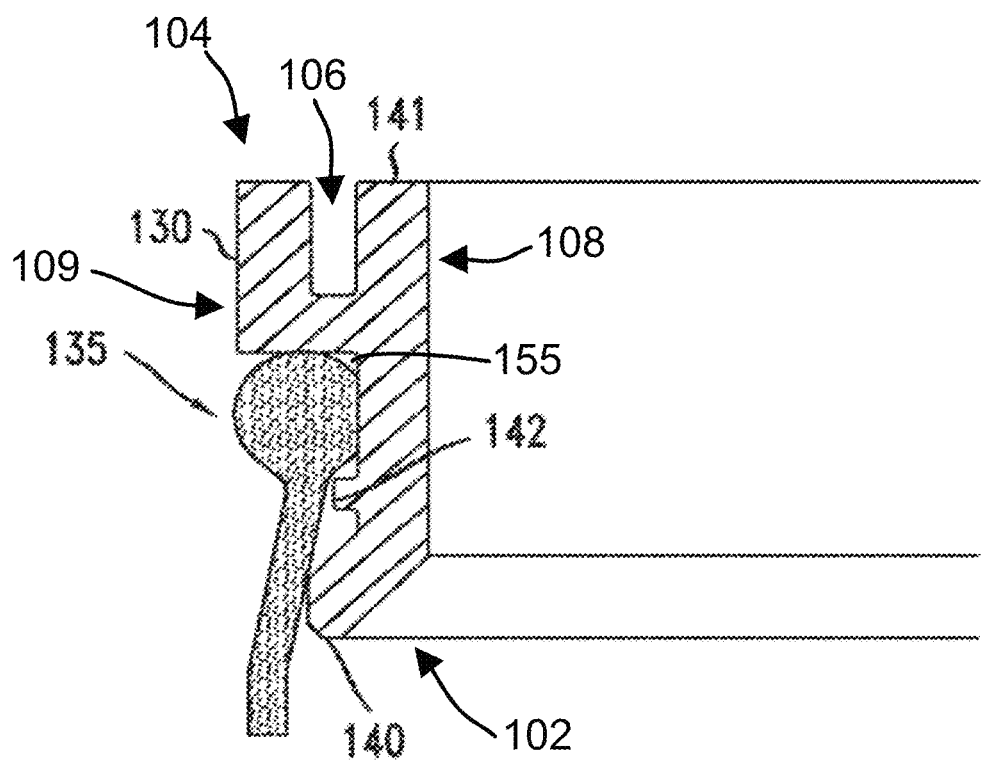
Figure 9:
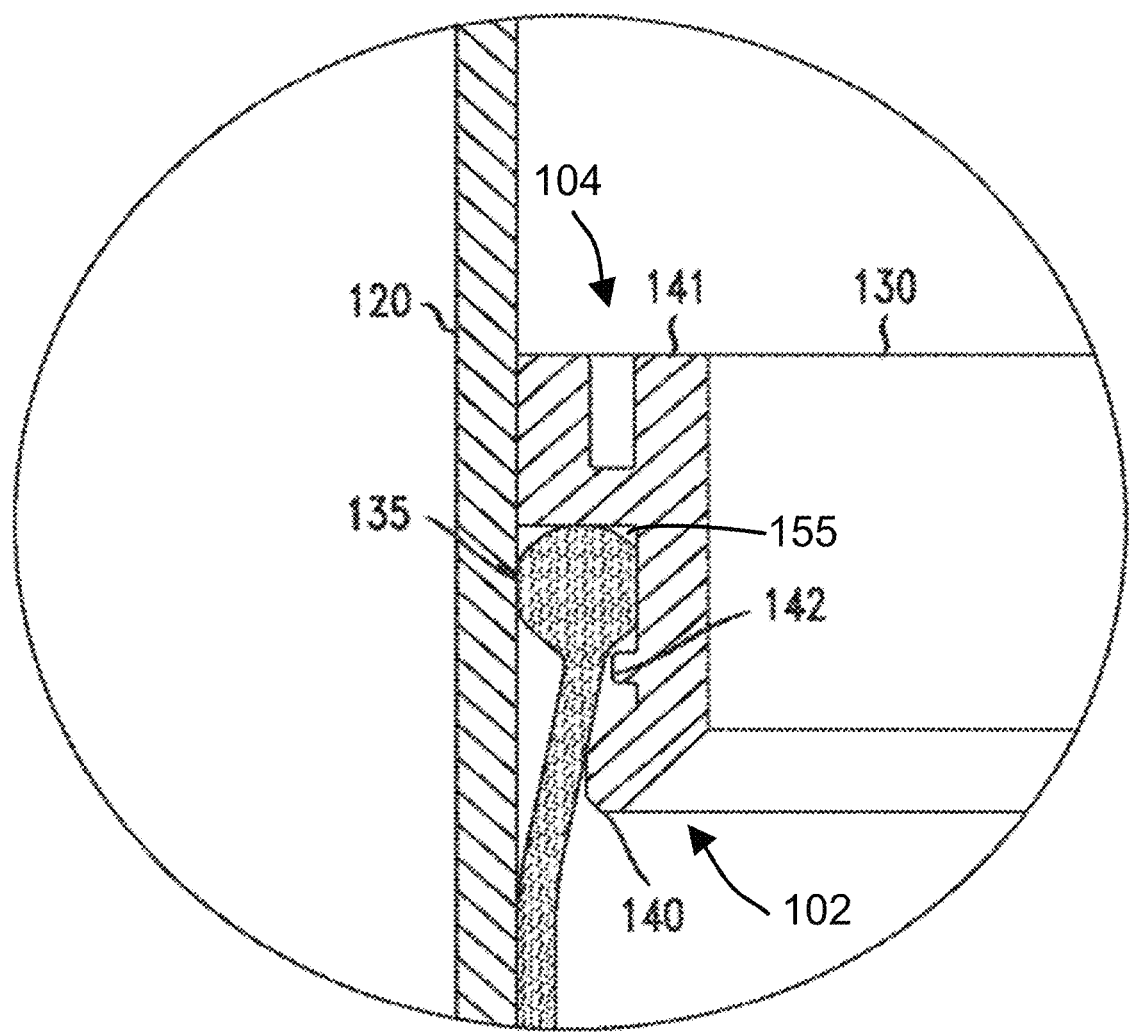
Figure 10:
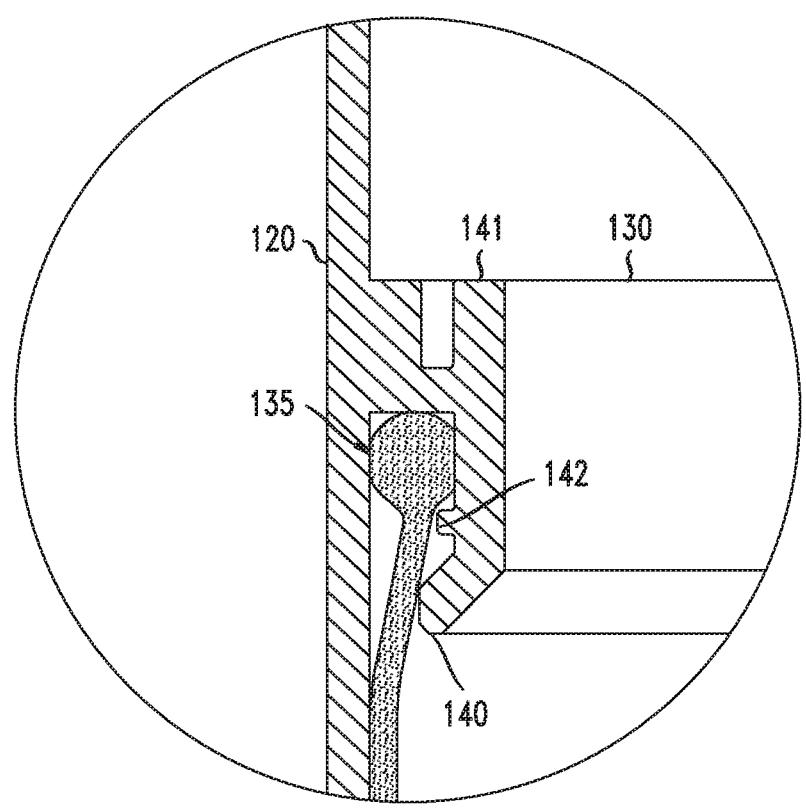
Figure 10A:
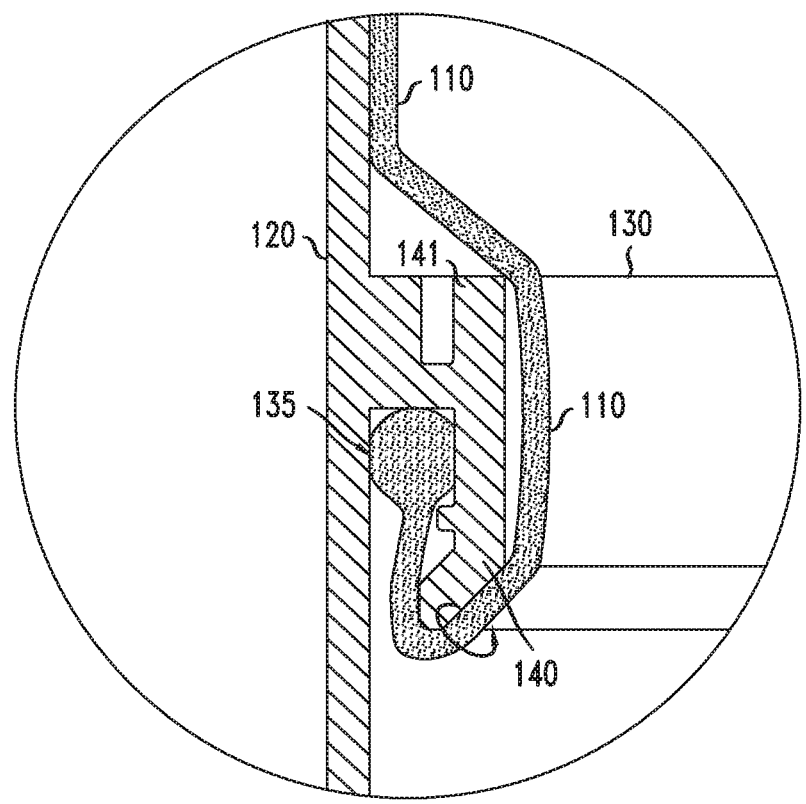

Having thus described the presently disclosed subject matter 5 in general terms, reference will now be made to the accompanying Drawings, which are not necessarily drawn to scale, and wherein:

FIG. 1 illustrates an elevation view of a hydropneumatic filament wound pressure vessel (herein referred to as an "FRP tank");

FIG. 2 illustrate is a cross-sectional view, the plane of section being indicated by the line 2-2 in FIG. 1;

FIG. 3 illustrates an enlarged cross-sectional view showing details of the seal area between the seal ring, tank liner sidewall, and the flexible diaphragm in an assembled state;

FIG. 4 illustrates an enlarged cross-section view of the seal profile on the flexible diaphragm before it is installed into the tank liner;

FIG. 5 illustrates an exploded view of the FRP tank before it is assembled and when it is applied to a split shell tank liner;

FIG. 6 illustrates an exploded view of the FRP tank before it is assembled and when it is applied to a three (3) piece injection molded domes and extruded sidewall tank liner;

FIG. 7 illustrates a cross section of the flexible diaphragm and seal ring preassembled before it is inserted into the tank liner;

FIG. 8 illustrates an enlarged cross-section of the seal ring and flexible diaphragm seal profile before it is inserted into the tank liner, as well as the stress reliever to reduce stress on the seal area during operation;

FIG. 9 illustrates an enlarged cross-section of the seal ring and flexible diaphragm after it is inserted into the tank liner, and showing the surface to surface contact between the seal ring and the tank liner;

FIG. 10 illustrates an enlarged cross-sectional view of the seal ring and flexible diaphragm permanently installed in the tank liner after the seal ring is welded to the tank liner sidewall; and FIG. 10A illustrates the enlarged cross-sectional view of the seal ring and flexible diaphragm when the tank is under water pressure in the water side of the diaphragm and the diaphragm is exerting pressure against the stress relieving members of the coupling ring.

Figure 11:
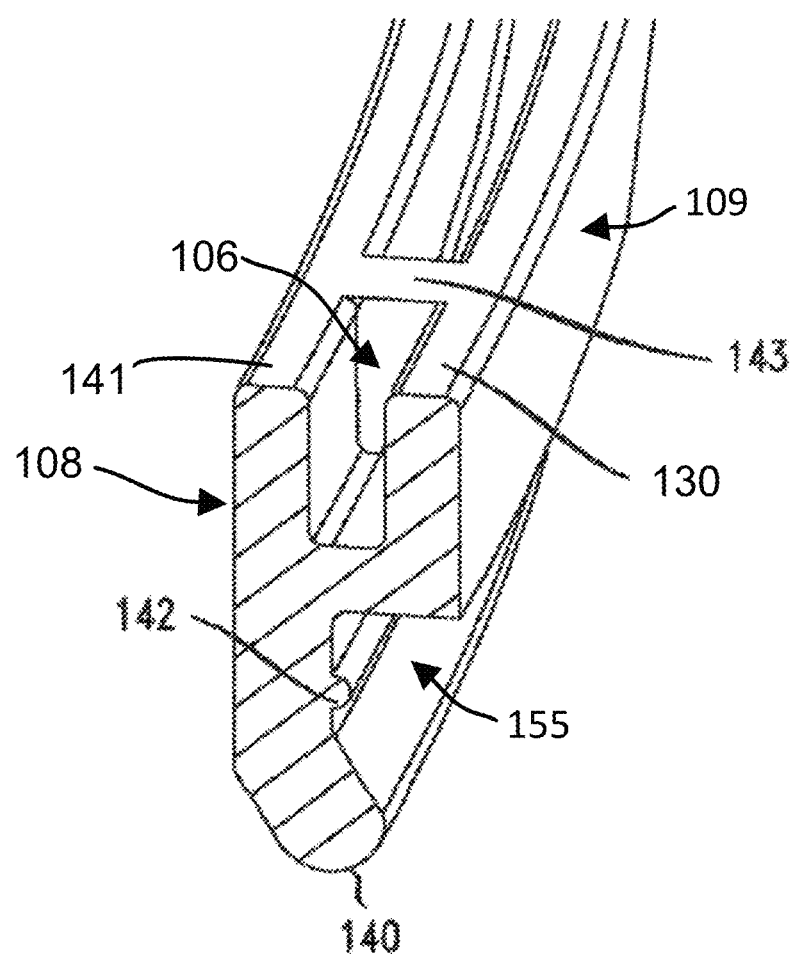

FIG. 11 is a partial cross-sectioned view of the seal ring, including the radial enforcement ribs at the top of the ring.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings.

Therefore, it is to be understood that the presently disclosed subject matter is not to be limited to the specific embodiments disclosed and that modifications and other embodiments are intended to be included within the scope of the appended claims. In an embodiment, the presently disclosed subject matter provides a fiberglass reinforced plastic pressure tank made with a plastic tank liner, a flexible, preferably rubbery, diaphragm and reinforced with a composite fiberglass/resin matrix. This type of tank is also known as a hydro-pneumatic filament wound pressure vessel (herein referred to as an "FRP tank"). The invention is generally used for residential and commercial water storage and water delivery applications requiring pressurized water. The described invention is an FRP tank and method for providing a low cost, reliable and repeatable method for installing a flexible diaphragm into the FRP tank.

Referring now to FIGS. 1-11, the present invention includes, in one embodiment, an FRP tank 100 that includes a plastic liner 105 with at least one axial opening 107. The FRP tank 100 may be reinforced with continuous strand fiberglass and further includes a flexible internal diaphragm assembly 110, that is preferably elastic or rubbery, (which is, typically, an elastomer or flexible thermoplastic). The plastic liner 105 can preferably be made of any rigid thermoplastic material suitable for use in potable water applications.

The flexible diaphragm 110, when installed in the plastic liner 105, forms two (2) hermetically sealed and independent chambers 115 as required for the FRP tank 100 application. The flexible diaphragm 110 may be positioned at any point along the cylindrical sidewall 120 of the FRP tank 100. The diaphragm 110 can be formed of a material comprising, by way of example only, a polymer, elastomer, rubber, RTV, or thermoplastic, or multiple layers compromising the same. In certain preferred embodiments, the diaphragm 110 comprises butyl rubber or EPDM. In other embodiments, the diaphragm may be filled with solids such as but not limited to particles or flakes of polymers or minerals including glass, talc, carbon and graphite; chopped fibers, discontinuous fibers, short or long fibers, or continuous fibers of polymers or minerals including glass or carbon; nanocomposites; clays; or other fibers, particles, flakes or hollow microspheres; or woven or non-woven fabrics; to improve the thermomechanical properties or decrease permeability of gases through the membrane. In some embodiments, multiple layers of the diaphragm can be bonded, but the layers can also be non-bonded. In certain embodiments, the layers include a thin, higher modulus layer supported by a thicker, lower modulus layer. The higher modulus layer can be selected from chemically resistant polymers, or polymers preferred for contact with potable water, such as polypropylene, polyethylene, polybutylene, or the like. The low modulus layer may be selected for different properties, such as durability, toughness, and low cost, protected from contact with the potable water by the high modulus layer.

The plastic liner 105 is preferably presented in a form that allows internal access prior to final application of the continuous strand fiberglass, such as a split shell injection molded liner or using one or a pair of unassembled injection molded domes 125 and extruded sidewall 120 plastic tank liner portion. The plastic tank liner 105 may also be a blow molded liner that has been cut around the circumference to allow internal access. The individual sections of the tank liner 105 and of the seal ring are preferably formed of non-metallic materials, selected from the group including preferably rigid thermoplastic polymers, whether plastic or elastomeric, or multilayer materials comprising the same; such as a group of thermoplastics including polyolefins, polyethylene, polypropylene, polybutylene, nylon, PVC, CPVC, ionomers, fluoropolymers, copolymers, crosslinked polyolefins such as crosslinked polyethylene (PEX, PEX-a. PEX-b, PEX-c or XLPE), or multilayer structures comprising the same. Although multiple incompatible layers can be used, layers formed of incompatible materials can preferably include a "tie layer" which is usually one or a combination of two or more mutually compatible materials that form a bonding layer between two mutually incompatible materials. Tie layers can include, for example, a thermoplastic material that provides adhesion to two adjacent materials, most often through melt processing or chemical reactions; modified acrylic acid, or anhydride grafted polymers or those similar to but not limited to DuPont's Bynel, Nucrel, and Fusabond grades, or those described and referenced, as further examples, in U.S. Pat. Nos. 8,076,000, 7,807,013 and 7,285,333. The melting point or melt index of the tie layer can be selected so that the tie-layer can be post-processed without substantially melting or flowing other non-metallics in the structure.

The FRP tank 100 may further include a seal ring 130 having a first end 102, a second end 104, an inner circumferential surface 108, and an outer circumferential surface 109. The seal ring 130 captures, in a seal profile 135 of the enlarged circumferential lip 135 of the flexible diaphragm 110, in a depression 155 in the outer circumferential surface 109. An annular protrusion 142 may protrude radially outward from the outer circumferential surface 109 of the seal ring 130 into the depression 155 and may help retain the enlarged circumferential lip 135 of the diaphragm 110. At least a portion of the outer circumferential surface 109 of the seal ring 130 can be secured to the cylindrical sidewall 120 of the plastic liner 105. The seal ring 130 preferably provides three (3) sides of the required seal containment while the tank liner 105 provides the 4th side of the seal containment. The seal ring 130 can be attached to the sidewall 120 of plastic liner 105 using any known/suitable industry standard welding methods such as, for example, spin welding, ultrasonic welding, and laser welding, or using compatible and inert adhesives. The seal ring 130 may further include a primary stress reliever 140 and a secondary stress reliever 141, both built into the seal ring 130 to reduce stresses on the seal profile 135 when water pressure in the chamber under the diaphragm causes the diaphragm to stretch out, as shown in FIG. 10A, during operation of the FRP tank 100. This can cause the circumferential lip (i.e., primary stress reliever) 140 to flex radially inwardly to relieve stress on the diaphragm seal 135 in response to pressure from the diaphragm. The seal ring 130 may form a annular gap 106 between the inner circumferential surface 108 and the outer circumferential surface 109, which may separate the secondary stress reliever 141 from the seal ring 130. As shown in FIG. 11, one or more support ribs 143 may connect the secondary stress reliever 141 to the seal ring 130 at periodic points around the circumference of the seal ring.

The seal ring 130 preferably provides a durable seal creating two (2) hermetically sealed chambers 115 of the FRP tank 100, and wherein the seal point may be located at any position along the sidewall 120 of the FRP tank 100. Further, the seal created by seal ring 130 provides a seal that can expand and contract with the pressure variations the 105 may also then be sealed together using known suitable industry standard welding or adhesive methods.

In another example, a diaphragm assembly method may include providing an unassembled three (3) piece tank liner 105 including dome portions 125 (e.g. an upper dome and a lower dome) and a sidewall 120 tank liner portion. Prior to assembling the three (3) piece tank liner 105, the flexible diaphragm 110 can be preassembled to the seal ring 130, for example, as shown in FIGS. 7 and 8. Preassembled flexible diaphragm 110 and seal ring 130 can then be inserted into the tank liner 105 and attached to the sidewall 120 using any known/suitable industry standard welding methods such as, for example, spin welding, ultrasonic welding, and laser welding. The upper and lower dome portions 125 may then be sealed to their respective upper and lower portions of the sidewall 120 using known/suitable industry standard welding methods.

The present invention provides a seal for the flexible diaphragm 110 that reduces the part count and processing cost over previous known sealing methods, provides a sealing method that eliminates the use of non-plastic crimping rings, and utilizes a proven and highly reliable 'O" Ring sealing method to create the hermetically sealed chambers 115.

Following long-standing patent law convention, the terms "a," "an," and "the" refer to "one or more" when used in this application, including the claims. Thus, for example, reference to "a subject" includes a plurality of subjects, unless the context 20 clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like 25 items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all 30 instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

In one example, a diaphragm assembly method can include providing an unassembled split shell tank liner 105. Prior to assembling the split shell tank liner 105, the flexible diaphragm 110 may be preassembled to the seal ring 130, for example, as shown in FIGS. 7 and 8. Preassembled flexible diaphragm 110 and seal ring 130 may then be inserted into the tank liner 105 and attached to the sidewall 120 of plastic liner 105 using any known/suitable industry standard welding methods such as, for example, 30 spin welding, ultrasonic welding, and laser welding. The split shell portions of tank liner 105 may also then be sealed together using known/suitable industry standard welding methods. In another embodiment, the parts can be sealed together using a suitable, inert but compatible adhesive Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

The invention claimed is:

1. An expansion tank for storing a pumped liquid under pressure, the expansion tank comprising:
    an outer shell including a first dome-shaped section and a second dome-shaped section joined with one another to form an internal volume defined by an inner surface of the outer shell;
    a seal ring having an inner circumferential surface and an outer circumferential surface between a first end of the seal ring and a second end of the seal ring opposite the first end, wherein:
        the outer circumferential surface is disposed against the inner surface of the outer shell and forms a depression extending completely around the outer circumferential surface, the depression defined between the first end of the seal ring and the inner surface of the outer shell, and
        a primary stress reliever is formed between the inner circumferential surface and the outer circumferential surface at the first end of the seal ring; and
    a diaphragm including an enlarged lip disposed around an outer circumference of the diaphragm, the enlarged lip being disposed in the depression between the outer circumferential surface of the seal ring and the inner surface of the outer shell so as to sealingly divide the internal volume of the outer shell into a first fluid-tight section and a second fluid-tight section,
    wherein the primary stress reliever is configured so as to flex radially inward toward the inner circumferential surface in response to pressure from the diaphragm.

2. The expansion tank of claim 1, wherein the seal ring further comprises an annular protrusion protruding radially outward from the outer circumferential surface and extending into the depression so as to hold the enlarged lip of the diaphragm in a sealing connection against the inner surface of the outer shell.

3. The expansion tank of claim 1, wherein the outer shell further comprises an exterior wrap of resin-impregnated fiber winding.

4. The expansion tank of claim 1, wherein the position of the seal ring is adjustable along an axial length of the inner surface of the outer shell.

5. The expansion tank of claim 1, wherein the outer shell and the seal ring are formed of mutually compatible thermoplastic materials.

6. The expansion tank of claim 5, wherein the enlarged lip of the diaphragm is in the shape of an O-ring.

7. The expansion tank of claim 1 further comprising a secondary stress reliever formed on the second end of the seal ring and extending axially away from the depression, the secondary stress reliever being configured to flex radially outward in response to pressure from the diaphragm.

* * * * *